United States Patent Office 3,481,236
Patented Dec. 2, 1969

3,481,236
MEANS FOR GUIDING THE PUNCH IN NIBBLING MACHINES AND THE LIKE
Sven M. A. Nicklasson, Goteborg, Sweden, assignor to Pullmax Aktiebolag, Goteborg, Sweden, a corporation of Sweden
Filed June 17, 1966, Ser. No. 558,450
Claims priority, application Sweden, June 17, 1965, 8,049/65
Int. Cl. B26d 7/06
U.S. Cl. 83—140           6 Claims

ABSTRACT OF THE DISCLOSURE

This relates to a nibbling tool which performs a continuous punching operation. A workpiece is intermittently advanced between a movable punch and a stationary die and during the working stroke the punch moves towards the die and cuts a chip out of the workpiece. The tool is provide with a guide bushing which clamps the workpiece to the die and which radially and axially guides the punch during the actual cutting portion of its stroke.

---

Sheet material, for instance sheet metal, can be machined by the application of the so-called short stroke technique. This technique involves machining the material between two tools of which the one (preferably the lower) is stationary and the upper moves in a direction towards the lower with relatively short amplitude and high frequency. By means of the short-stroke technique the work piece may be worked by cutting methods or plastic deformation. One of the most important applications of the short stroke technique is cutting; knives being used with relatively short cutting edges and so designed that curved as well as straight cuts can be made. Nibbling constitutes a special application, i.e. a form of continuous punching.

Figure 1:
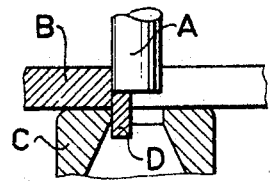
Figure 2:
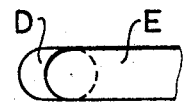
Figure 3:
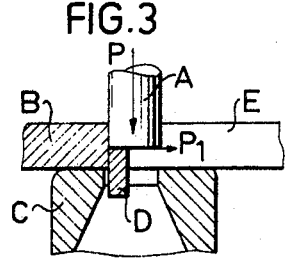

When punching, the work piece is worked between a movable punch and a stationary die. Usually the cross section of the punch is circular, although other cross-sectional shapes occur, e.g. square or rectangular. The punch passes into the die opening, with a suitably adjusted small clearance between the cutting edges of said die and punch. When nibbling, a groove is cut out in the work piece the width of the groove being the same as the width of the punch. This is illustrated in the accompanying drawings FIGS. 1–4 which diagrammatically show the working sequences in nibbling. On every working stroke of the punch A the work piece, in this case a metal sheet B, is advanced through a set distance which usually constitutes 25–30% of the diameter of the punch in the direction of feed. The punch A moves in a direction towards the die C and on every working stroke cuts a chip out of the plate (FIG. 1). When using a circular-cylindrical punch this chip, D, takes the shape of a quarter moon (FIG. 2). Usually the punch passes down until its end surface meets the upper, flat end surface of the die and passes somewhat past the same. By effecting a series of punching movements in sequence, as described, the required portion E is cut out of the plate B. One of the advantages of nibbling is thus on completion of the operation the plate is still flat. In this respect nibbling differs advantageously from, for instance, cutting with inclined knives. When cutting according to the last mentioned method the work piece is unavoidably subjected to a certain deformation.

Figure 4:
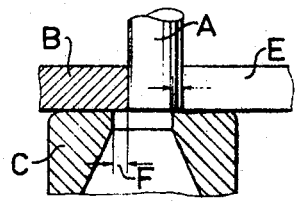

An important condition for obtaining good results when nibbling be that the punch is accurately guided in relation to the die so that considerable side play, so-called cut gap, is maintained between punch and die. In this respect greater demand is placed on nibbling than on other operations carried out in so-called short-stroke machines, i.e., machines working in accordance with the short-stroke technique. In other operations, such as shearing with normal knives, moulding operations etc. requirements placed on guiding tolerance between the tools are not so high as those when nibbling. The problem of ensuring the necessary guidance between punch and die when nibbling is fully illustrated on closer study of the force sequence occurring during a nibbling operation. Firstly the punch exerts a vertical force P (FIG. 3) on the work piece. Due to the reaction effect from the force field around the knives a component of force $P_1$ appears inside the material, said force $P_1$ being directed from the cutting edge towards the free space in the sheared groove. This force attempts to displace the punch A to one side. Such displacement of the punch is most unfavourable to the shearing sequence. Firstly such a displacement causes the formation of a too large shearing slot F between the knives and secondly the side of the punch facing away from the knives strikes against the die (FIG. 4). To overcome the said side displacement it is possible to adopt various counter measures. Consequently the construction of the machine, in its entirety, may be very rigid and with a very small play in the guides of the punch holder, in addition to which clamping of tools can be effected so that deformation and warping are avoided. Further, it is also possible to design very strong and rigid punch and the holders to prevent flexibility. However, it is difficult to prevent a certain amount of flexibility in the punch proper in such cases where said punch has a relatively small cross section.

To avoid the mentioned disadvantages it is known to arrange guides for the punch proper immediately above the work piece to be nibbled. Such guides are often arranged rigidly connected to the frame of the machine or the cooperating die. Such constructions disadvantageously restrict the working potential of the machine with respect to the size of the work pieces. The present invention relates to a means for avoiding the above mentioned disadvantages.

A means according to the present invention for guiding the punch in nibbling machines and the like, in which the punch is arranged in a reciprocating tool holder and is slidably guided in a holder member, or guide bushing is mainly characterized in that the guide bushing is resiliently connected with the work tool holder in the direction of movement of the same and is supported by said tool holder in such a way that when the tool holder is moved in a direction towards the die, the guide member first forces the work piece until it is securely clamped between the die and the holder member, after which on continued movement of the work tool holder the punch during cutting is caused to slide in the holder member or guide bushing towards the die and thereby guided by the holder member.

Figure 5:
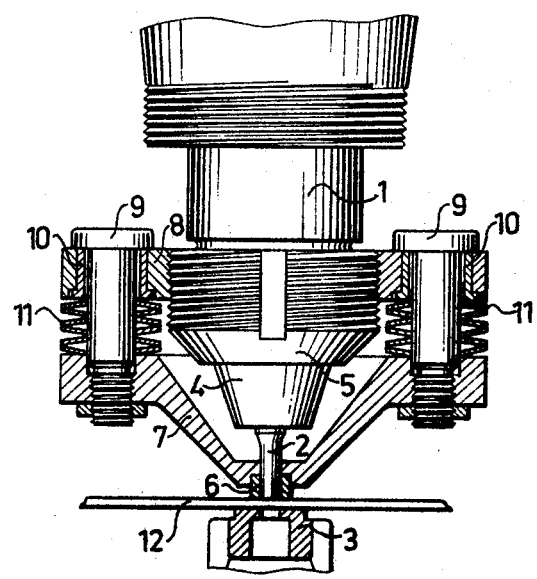

The invention will be more closely described below with reference to the accompanying drawings, wherein FIG. 5 shows an embodiment of the invention while FIGS. 6–9 show the arrangement according to FIG. 5 in different working positions.

Secured in a reciprocating tool holder or guide bushing 1 is a nibbling punch 2 cooperating with a nibbling die 3. The punch is inserted in a conical adapter sleeve 4 secured by a nut 5. Around the punch is arranged a guide bushing 6 in which the punch can run with a small clearance. The guide bushing is secured in a holder 7 which is connected with an eye nut 8, vertically adjustable around the nut 5 by means of threads. The connection between the holder 7 and the eye nut 8 is designed in a form of two or more bolts 9 which are threaded in the holder 7 and run in bushings 10 in the eye nut 8 with a play which is greater than the play between the punch 2 and the guide bushing 6. Spring washers 11 are placed between the holder 7 and the eye nut 8 and hold the eye nut and holder apart. A plate or workpiece 12 is arranged between the punch and die.

Figure 6:
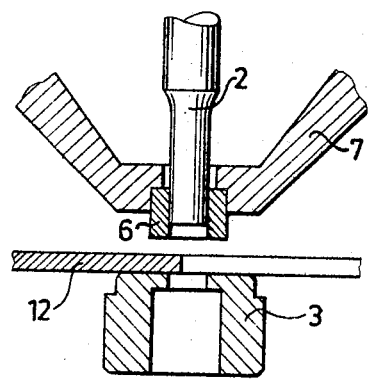
Figure 7:
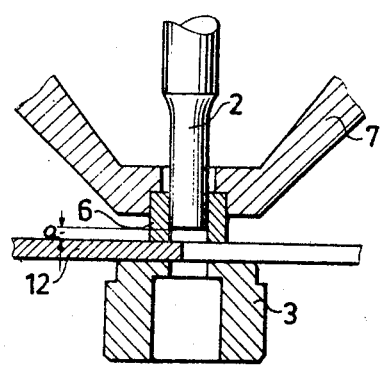

The manner in which the arrangement functions will now be described with reference to FIGS. 6, 7, 8 and 9. FIG. 6 shows the punch in a top position and similarly the guide 6 in the holder 7 also in a top position. On movement of the tool holder 1, and thus also the holder 7, downwards the guide 6 first strikes the plate 12. The punch still has a certain distance to pass before it reaches the plate, FIG. 7. On continued movement of the punch 2 downwards the holder 7 together with the bushing 6 remains in position whilst the holder 8 (the eye nut) follows downwards. The spring washers 11 are thus compressed. This set of springs are already adjusted, at rest, to a certain pre-tension by tightening the bolts 9. The spring force is suitably adapted so that only a relatively small increase in force is obtained during movement of the punch 2, and thus also the tool holder 1, through the distance a.

Figure 8:
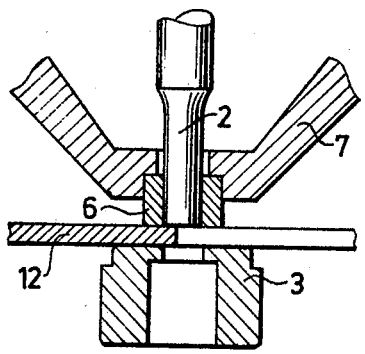
Figure 9:
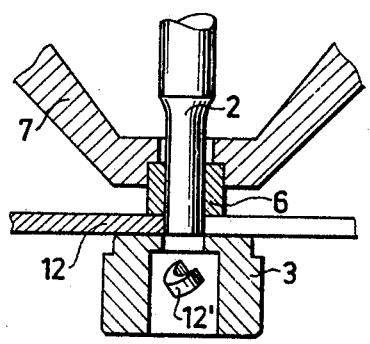

As can be seen from FIG. 8 the punch 2 has reached the plate 12 and the shearing process can begin. The plate 12 is thus pressed against the die by the guide bushing 6 so that a certain frictional force exists between bushings 6 and plate 12. Further, friction exists between the die 3 and the bottom surface of the plate. The bushing 6 is held in position with respect to the die 3 by the action of the frictional forces and serves as a guide for the punch when shearing is taking place, FIG. 9, the portion cut from the plate 12 being indicated by the reference numeral 12'.

By suitably adjusting the springs 11 and the eye nut 8 a suitable frictional force, adapted for each operation is obtained to ensure the required fixing of the guide bushing 6 with respect to the die, and thereby the requisite guidance for the punch. By giving the guide bushing and the die a suitable surface design, e.g. in the form of annular grooves, lattice-work, teeth, etc., the ability of the engaging surfaces to grip becomes such greater.

The shown arrangement has particular advantages in that the punch is guided immediately adjacent to the plate in complete independence of the structural design of the short-stroke machine in general. This offers the possibility when nibbling to use a short-stroke machine designed for normal shearing and moulding tools, where a certain flexibility between the tool can be permitted and where in many cases eccentric loads, as with nibbling, do not occur. Although such a machine is not normally suited for nibbling it can in fact be used to advantage for nibbling work if the shown arrangement is adapted.

What is claimed is:

1. In a machine tool for nibbling and the like, in combination, a tool holder mounted for reciprocal movement, a machine tool detachably connected to said tool holder for movement therewith, a guide bushing radially guided by said machine tool and movable therewith during a portion of its reciprocal movement and radially guiding said machine tool during the nibbling portion of its reciprocal movement constituting the working portion of its stroke, means resiliently mounting said guide bushing on said tool holder with substantial radial free play therebetween and coaxially with said machine tool for allowing said guide bushing to be radially and axially guided by said machine tool during their reciprocal movement toward and away from a workpiece, said resilient mounting means including means for rendering said guide bushing effective to releasably clamp the workpiece in position for engagement by said machine tool and to radially and axially guide said machine tool throughout the working portion of its stroke, whereby lateral forces developed and applied on said machine tool during the working portion of its stroke are compensated by said guide bushing.

2. In a machine tool according to claim 1, in which said guide bushing comprises a tubular bushing constantly circumferentially of said tool.

3. In a machine tool according to claim 2, in which said tool comprises a punch.

4. In a machine tool according to claim 2, in which said means resiliently mounting said guide bushing comprises means mounting said bushing for relative axial travel between said guide bushing and said tool holder and the tool when said guide bushing engages said workpiece.

5. In a machine tool according to claim 4, in means resiliently mounting said guide bushing comprises spring means compressible and extensible in a direction parallel to the directions of travel of said tool holder.

6. In a machine tool according to claim 5, including means to variably adjust the compressibility and extensibility of said spring means.

References Cited

UNITED STATES PATENTS

| 2,039,847 | 5/1936 | Howland-Shearman | 83—140 X |
| 2,376,829 | 5/1945 | Sokolowsky | 83—140 |
| 3,140,630 | 7/1964 | Wolf | 83—140 |
| 3,296,905 | 1/1967 | Killaly | 83—140 |

ANDREW R. JUHASZ, Primary Examiner

U.S. Cl. X.R.

83—916